Jan. 2, 1934.  B. MOLLBERG  1,941,482

DRAIN VALVE

Filed April 13, 1931

BYRON MOLLBERG
INVENTOR

BY *[signature]*

ATTORNEY

Patented Jan. 2, 1934

1,941,482

UNITED STATES PATENT OFFICE 1,941,482

DRAIN VALVE

Byron Mollberg, St. Louis, Mo., assignor to Carter Carburetor Corporation, St. Louis, Mo., a corporation of Delaware Application April 13, 1931. Serial No. 529,732

6 Claims. (Cl. 251—43)

This invention relates to a simple and efficient drain valve of new and improved construction.

The invention will be better understood upon reference to the accompanying drawings, in which.

Figure 1:
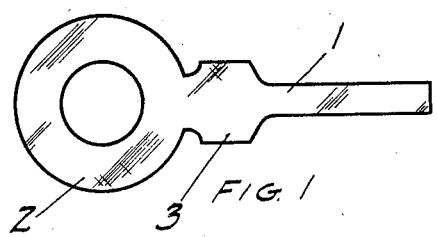
Figure 1 shows a side elevation of the sheet metal blank from which the valve is made.
Figure 2:
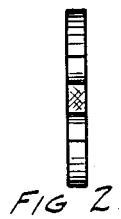
Figure 2 is an end view of the blank shown in Figure 1.

The valve comprises only two parts: a valve body and a stem member 1 or valve proper which is punched or blanked from sheet metal stock as indicated in Figures 1 and 2. The parts of the blank may be referred to as a handle 2 which may be of any suitable formation, a thread portion 3 which is to be threaded in any suitable manner, and a stem portion 1 which is to be headed over or upset to form a valve head 4, as indicated in Figures 3 and 7.

The blanks as shown in Figure 1 are punched from sheet metal stock in a manner which will be readily understood by those skilled in the art. After the blanks have been punched out or otherwise worked into the shape shown in Figure 1, the thread portion 3 is threaded in any suitable manner, preferably by stamping in a threaded die as hereinafter described.

Figure 3:
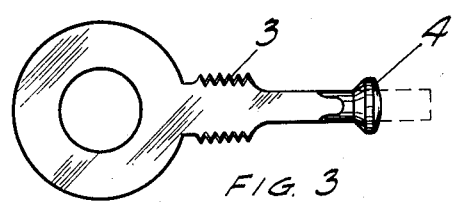
Figure 3 is a side elevation of the valve which is formed from the blank shown in Figure 1.
Figure 4:
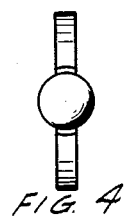
Figure 4 is an end view of the valve shown in Figure 3.
Figure 5:
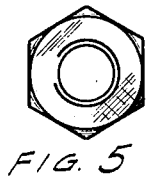
Figure 5 is an end view of the valve body.
Figure 6:
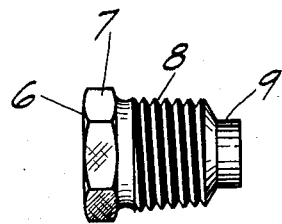
Figure 6 is a side view of the valve body.
Figure 9:
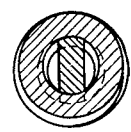
Figure 9 is a sectional view of the completed drain valve taken along the line 9—9 of Figure 7.
Figure 7:
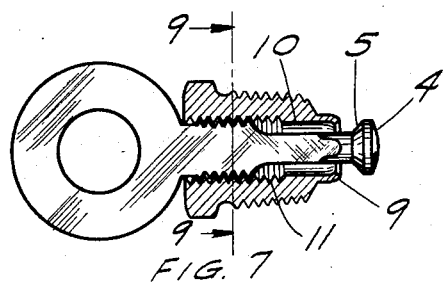
Figure 7 is a sectional view of the completed drain valve.
Figure 8:
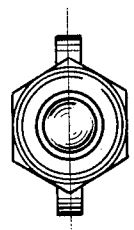
Figure 8 is an end view of the completed drain valve.
Figure 10:
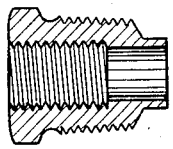
Figure 10 is a longitudinal sectional view of the valve body prior to assembly.

In order to form the valve head, the stem 1 is gripped in a suitable die and hammered, spun, or peened in such a manner as to swell the end to the form shown in Figures 3 and 7. It will be understood that during this operation the inner bevel or face 5 of the valve is directly supported on a surface of the die, so that it will be quite smooth when finished. In some cases where accurate work is necessary, the valve face 5 may be shaved or turned if desired.

The valve body 6 is formed in an automatic screw machine and comprises a hexagonal wrench portion 7, an integrally threaded portion 8, and a seat portion 9. The inside of the valve body is provided with a bore 10 extending longitudinally through the valve body concentric with the seat portion 9. The outer end of the bore 10 is threaded at 11 to receive the screw threaded portion 3 of the valve proper. It will be noted that the diameter of the bore 10 is substantially the same as the diameter of the valve head 4, so that the head can be slipped through the bore in assembly.

The valve is assembled by passing the valve head 4 through the bore 10 and threading the valve into the body by means of the threads 3 and 11. After assembly, the seat portion 9 is rolled or spun inwardly so that the diameter of its outside end is less than the diameter of the valve head 4. The tip end of the seat portion may be shaved, if desired, after the spinning operation, so that it will be perfectly true with the face of the valve 5, but this is not absolutely necessary as I prefer to form the valve of hard material and the valve body of soft material, so that the seat can be made to conform with the face of the valve by simply tightening the valve on the threads 3.

In operation, the valve may be closed by screwing the valve head outwardly until the valve face 5 contacts with the seat portion 9, and it may be opened by screwing in the opposite direction. It will be noted that the fluid passageways through the valve lie on opposite sides of the flat valve member 1 which, of course, does not conform to the circular cross section of the bore 10 or the threads 11.

It will be understood that the invention is susceptible of many modifications, and, accordingly, I do not wish to be limited in my protection, except as set forth in the accompanying claims.

I claim:

1. In a device of the class described, a valve body having a longitudinal passageway therethrough, said passageway having a restricted portion and a threaded portion, a valve member screw threaded into said threaded portion and extending through said restricted portion, said valve member having an integral head on the opposite side of said restricted portion from said screw threaded portion, said restricted portion being of smaller diameter than either said head or said threaded portion.

2. In a device of the class described, a valve body having a longitudinal passageway therethrough, a restricted portion in said passageway, said restricted portion forming a valve seat, a valve member extending through said passageway and said restricted portion, said valve member having an integral handle at one end and an integral valve head at the other end, said handle and head being of larger diameter than said restricted portion.

3. In a device of the class described, a valve body having a longitudinal passageway therethrough, a valve having a sheet metal portion extending longitudinally through said passageway, said sheet metal portion having a thickness less than the diameter of said passageway, said passageway having an interior threaded portion, and said valve member being threaded at its edges to cooperate with the threads in said body member.

4. A valve comprising a body member having a screw threaded passageway therethrough terminating in a valve seat, a valve stem having a head adapted to close against said seat, said stem having a mutilated thread thereon, thereby forming one or more longitudinally extending passages between the screw threads of the body member and the stem of the valve.

5. A valve comprising a body member having a screw threaded passageway therethrough terminating in a valve seat, a valve stem having a head adapted to close against said seat, said stem having a mutilated thread thereon, thereby forming one or more longitudinally extending passages between the screw threads of the body member and the stem of the valve, and a handle integral with said valve stem and of larger cross section than the cross section of the passageway in the body member.

6. A valve comprising a body member having a screw threaded passageway therethrough terminating in a valve seat, a valve stem having a head adapted to close against said seat, said stem having a mutilated thread thereon, thereby forming one or more longitudinally extending passages between the screw threads of the body member and the stem of the valve, a handle integral with said valve stem and of larger cross section than the cross section of the passageway in the body member, said head on said stem being integral therewith, and said head being of larger diameter than said valve seat.

BYRON MOLLBERG.